United States Patent [19]
Wagner

[11] 3,818,255
[45] June 18, 1974

[54] BEARING ASSEMBLY FOR POWER TOOLS HAVING A PLASTIC HOUSING

[75] Inventor: Robert W. Wagner, Easley, S.C.

[73] Assignee: The Singer Company, New York, N.Y.

[22] Filed: July 30, 1973

[21] Appl. No.: 383,948

[52] U.S. Cl.................... 310/50, 310/62, 310/90
[51] Int. Cl. ............................................ H02k 9/06
[58] Field of Search ............ 310/47, 50, 89, 90, 43, 310/57, 62, 63, 60, 61

[56] References Cited
UNITED STATES PATENTS

| | | | |
|---|---|---|---|
| 2,779,883 | 1/1957 | Schumann | 310/50 |
| 3,121,813 | 2/1964 | Pratt et al. | 310/50 |
| 3,171,994 | 3/1965 | Freedman et al. | 310/50 |
| 3,219,855 | 11/1965 | Zimmerman | 310/57 |
| 3,221,192 | 11/1965 | Franklin | 310/50 X |

Primary Examiner—D. F. Duggan
Attorney, Agent, or Firm—Marshall J. Breen; Chester A. Williams, Jr.; Harold Weinstein

[57] ABSTRACT

A bearing assembly for a power tool, such as a drill, having a plastic housing in which is mounted a universal motor. The motor has an armature and a stator, with the armature shaft disposed axially in the housing and having a fan affixed thereto. Cooling apertures are formed in a motor chamber in the housing in axially spaced relationship to each other on either side of the fan to permit ventilating air to enter and to exit the housing to cool the motor. A first bearing means journals one end of the armature shaft in the housing. An improved second bearing journals the other end of the armature shaft adjacent a second chamber which may be in communication with the motor chamber. The improved bearing includes a plurality of circumferentially spaced axial apertures that are formed to permit the flow of ventilating air from the second chamber therethrough, drawn by the fan in the motor chamber, to cool the second bearing and the housing.

5 Claims, 6 Drawing Figures

PATENTED JUN 18 1974 3,818,255

BEARING ASSEMBLY FOR POWER TOOLS HAVING A PLASTIC HOUSING

BACKGROUND OF THE INVENTION

In the prior art, problems associated with heat dissipation in power tools have been critical in some instances, expecially when the housings are made of plastic. The general problems of heat dissipation are multiplied by the use of plastic housings, and can result in over-heating of either the bearings or the housing. Also, the alignment of running parts such as the armature shaft can be upset by excessive heating of the bearings, resulting in either mechanical or electrical failure of the power tool. In attempting to overcome such problems, the prior art has resorted to the use of bulky or multi-component heat sinks and heat isolators, and the use of the more expensive components, such as ball or needle bearings. In addition, the housings tend to become more complex through the use of metal inner frames or sleeves that are used to hold the dimensional stability required of close tolerance rotational power components.

SUMMARY OF THE INVENTION

It is an object of the present invention to provide an improved bearing assembly for power tools which overcomes the prior art disadvantages; which is simple, economical and reliable; which uses a bearing having a plurality of apertures to pass ventilating air therethrough; which uses a non-rotatively mounted bearing assembly; which uses a bearing mounted intermediate a motor chamber and a second chamber and having ventilating apertures therein to pass ventilating air therethrough; which uses an improved bearing having ventilating apertures therein for mounting in a plastic housing; which uses a bearing having ventilating apertures in communication with a second chamber to circulate air from either inside or outside the housing through the bearing apertures to cool the same; and which uses a bearing as a grease seal between the gear chamber and the motor chamber.

Other objects and advantages will be apparent by the following description of one embodiment of the invention and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
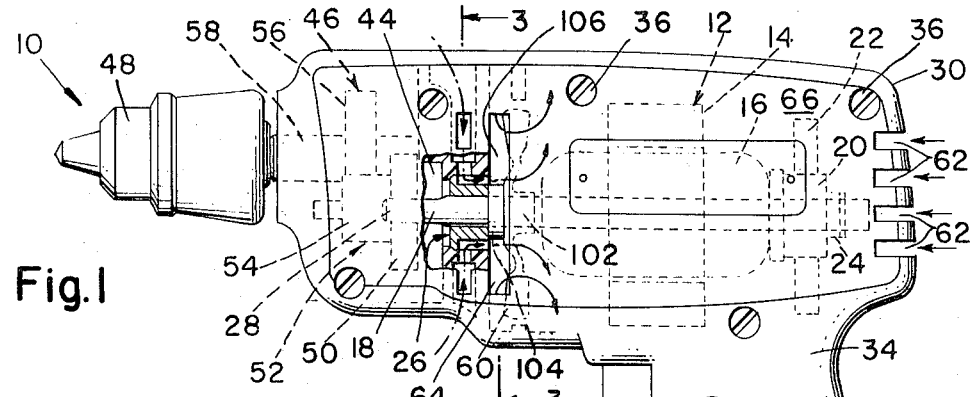
FIG. 1 is a side elevational view, partly in section, of a power tool, such as a portable drill, embodying the present invention.

A power tool, such as a portable power drill 10, is shown in FIG. 1 embodying the present invention. The drill 10 includes an electric universal motor 12 having a stator 14, an armature 16 and an armature shaft 18 which carries a commutator 20, engaged by a brush assembly 22. The armature shaft 18 is journaled adjacent its ends by axially spaced bearings 24 and 26, of which bearing 26 defines the improved bearing of the present invention. A drive pinion 28 is formed at the forward end of the armature shaft 18. The universal motor 12 is mounted in a plastic housing 30 which in the preferred embodiment illustrated in FIG. 1 is of the clam-shell type having a support portion 32 and a cover portion 34 shown in FIG. 3 suitably connected to each other as by screw means 36. The housing 30 has an integrally formed pistol-grip grip handle 38 which receives an electrical cord 40 that in turn is connected through a trigger switch 42 to the motor 12 in the usual manner.

A gear chamber 44 is formed in the front portion of the housing 30 and has a gear train 46 mounted therein to transmit the rotational movement from the motor 12 to a chuck 48 which is adapted to drive a suitable bit or implement that comes into engagement with the work. The gear train 46 is illustrated in FIG. 1 by dotted lines and serves the conventional function of (1) reducing the relative high rotational speed of the drive pinion 28, and (2) increasing the torque delivered to the chuck 48. The gear train 46 includes the pinion 28 which engages a larger gear 50 of a cluster gear 52, the smaller gear 54 of which engages a spindle gear 56 carried by the spindle 58, the projecting end of which has the chuck 48 affixed thereto.

A fan 60 shown in FIG. 1 is mounted on the armature shaft 18 intermediate the armature 16 and the improved front bearing 26. The housing 30 has a lurality of inlet apertures 62 and outlet apertures 64 formed in the support portion 32 and the cover portion 34, respectively of the housing 30. The fan 60 has a draft side facing rearwardly so that air is drawn into the housing 30 through the inlet apertures 62 located at the rearward end of the housing 30 to cool the motor 12 before being discharged through the outlet apertures 64 formed slightly forwardly of the fan 60.

The motor 12 is mounted within the motor chamber 66 of the housing 30, which chamber is in communication with the inlet 62 and the outlet 64. The gear chamber 44 is formed at the forward end of the housing 30, while the motor chamber 66 is formed at the rearward end of the housing 30. An intermediate or second chamber 68 is formed between the gear chamber 44 and the motor chamber 66 and separated therefrom by a front wall 70 and a rear wall 72. The sides of the second chamber 68 are enclosed by a side support wall 32a and a side cover wall 34a of the respective support portion 32 and cover portion 34. Aligned recesses 74 and 76 are formed in the respective support portion 32 and cover portion 34 to define a circular opening 78 having an internally extending flagne 80 formed at its forward end to define a shoulder 82 facing rearwardly. In the preferred embodiment of the invention shown in FIGS. 1 and 3 an external secondary inlet 84 is formed in each of the side walls 32a and 34a. At the lower end of the front wall 70 and the rear wall 72 an annular lower wall 86 is formed in the second chamber 76 to surround the circular opening 78. A plurality of secondary outlets 88 are formed circumferentially about the lower wall 86 with a plurality of ribs 86a between adjacent secondary outlets 88. The secondary outlets communicate the second chamber 68 with the circular opening 78.

Figure 2:
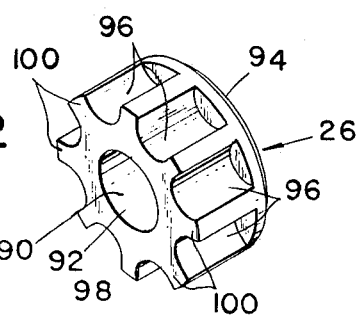
FIG. 2 is an exploded perspective view of the improved bearing of the present invention with the bearing turned around from its FIG. 1 position.

The improved bearing 26 is best shown in FIG. 2 wherein the sleeve 90 has a central aperture 92 in which the armature shaft 18 will be journaled. An annular flange or grease seal 94 is formed at the forward end of the bearing 26. A plurality of circumferentially spaced apertures or axial slots 96 extend from the flange 94 rearwardly to terminate in a rear face 98. A plurality of radial projections or ribs 100 are formed circumferentially about the sleeve 90 alternately with the slots 96.

The bearing 26 will be mounted within the circular opening 78 so that the flange 94 abuts the shoulder 82 to seal the grease within the gear chamber 44 and prevent it being transmitted rearwardly to either the second chamber 68 or the motor chamber 66. In mounting the bearing 26 within the circular opening 78 the slots 96 will be aligned with the secondary outlets 88 and the ribs 100 will be radially algined with the ribs 86a whereby communication is provided from the second chamber 68 through the outlet 88 and slots 96 to the motor chamber 66 at the outlet 64 thereof, for purposes more fully explained hereinafter.

The fan 60 has a hub 102 which is fixedly connected to the armature shaft 18. A spacer 104 is carried on the armature shaft 18 forwardly of the hub 102 so that in mounted position the spacer 104 will engage the rear face 98 of the bearing 26 and urge the bearing 26 to have its flange 94 remain in contact with the shoulder 82 as is illustrated in FIG. 1.

During operation of the drill 10 the armature 18 will rotate and cause the fan 60 to rotate, thus drawing cooling air from outside the housing 30 through the inlet 62 into the motor chamber 66 to cool the motor 12 before being discharged from the outlet 64. A low pressure zone 106 is formed in superposition about the spacer 104 forwardly of the hub 102 in communicaton with the slots 96 to produce a suction affect in the second chamber 68 which draws secondary cooling air in through the external secondary inlet 84 into the second chamber 68 to pass through the secondary outlet 88 into and through the axially slots 96 of the bearing 26 to the low pressure zone 106 from which it exits out the outlet 64 being induced therefrom by the flow of primary air in the motor chamber 66. The secondary air passing through the axial slots 96 passes in heat exchange relation with the bearing 26 to cool the same to a sufficiently low temperature to prevent excessive heat build-up in the bearing 26 and the adjacent housing 30. The secondary air passing through the bearing 26 will wash the surfaces of the ribs 100 and the slot 96 to dissipate the heat sufficiently to prevent over-heating of either the bearing 26 or the adjacent housing 30.

Figure 3:
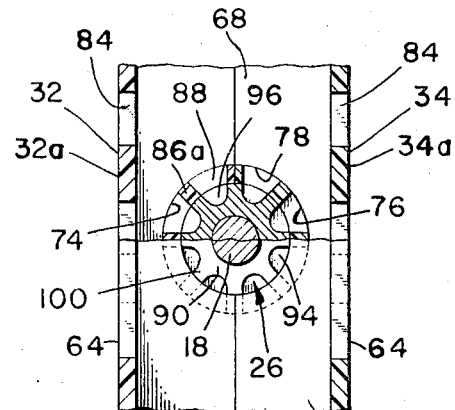
FIG. 3 is a rear elevational view, partly in section, taken along line 3—3 of FIG. 1.
Figure 5:
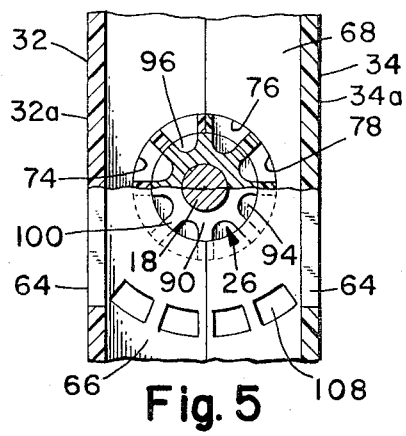
FIG. 5 is a rear elevational view, partly in section, taken along line 5—5 of FIG. 4.
Figure 4:
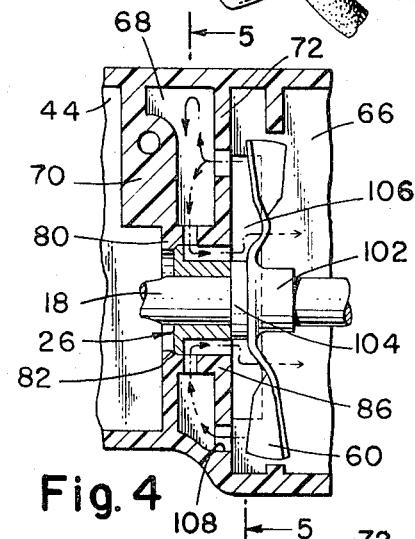
FIG. 4 is an enlarged fragmented side elevational view of a modified form of the invention showing a second chamber in communication with the motor chamber.

A second embodiment of the invention is shown in FIGS. 4 and 5 wherein like reference numbers will be used for the same components shown and described in the previous embodiment of the invention set forth in FIGS. 1, 2 and 3. In FIGS. 4 and 5 bearing 26 is mounted within a circular opening 78 as set forth hereinbefore. The secondary cooling air is introduced into the second chamber 68 through a plurality of internal secondary inlets 108 formed in the rear wall 72. A portion of the primary air being drawn through the motor chamber 66 will be delivered through the internal secondary inlets 108 into the second chamber 68 to circulate therein radially downwardly through the secondary outlets 88 to pass in heat exchange relation with the bearing 26 through the slots 96 being drawn therethrough into the low pressure zone 106, and then induced by the remainder of the primary air to exit the outlets 64.

Figure 6:
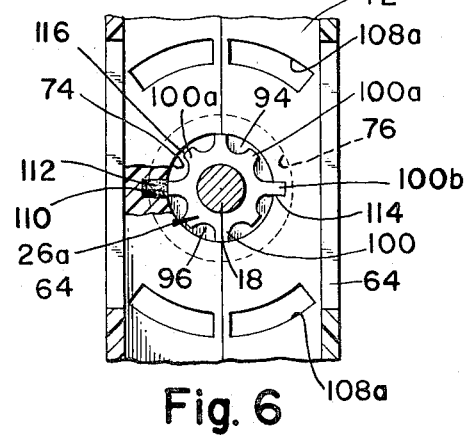
FIG. 6 is a rear elevational view, partly in section, of a modified improved bearing non-rotatively mounted in the housing in a similar view as that shown in FIG. 5.

In the modified form of the invention shown in FIG. 6 like reference characters are used for parts similar or the same to those described hereinbefore in the other embodiments of the invention, and that described previously will only be referred to sufficiently to explain the FIG. 6 embodiment of the present invention. Recess 74 has a circular side aperture 110 into which is disposed a resilient plug 112. An axial slot 114 is formed in the recess 76 diametrically opposite the aperture 110. One of the ribs 100 of the bearing 26a has an axial projection 100b which increases the radial length thereof and is sized to fit within the axial slot 114. The ribs 100 and 100b are four in number and will be disposed along quadrant lines so that except for the longer rib 100b the diameter will be equal to that of the flange 94. Ribs 100a of shorter radial projection are formed between the ribs 100 and 100b so as to form a space 116 which communicates adjacent pairs of slots 96.

The internal secondary inlet 108a is formed in the rear wall 72, both above and below the armature shaft 18 adjacent the upper end of the fan 60.

The bearing 26a will be disposed within the circular opening 78 so as to place the rib 100b within the axial slot 114 to render the bearing 26a non-rotative. The bearing 26a will have the rib 100 which is diametrically opposite the elongated rib 100b in engagement with the resilient plug 112 so as to slightly compress the same and render the mounting of the bearing 26a firm within the opening 78.

Upon operation of the drill 10 the motor 12 will be actuated to rotate the armature shaft 18 and the connected fan 60 to draw primary air in through the inlets 62 to suitably ventilate the motor 12 and motor chamber 66 prior to discharge from the outlet 64. A portion of the primary air will be directed through the internal secondary inlet 108a into the second chamber 68 wherein it will be withdrawn through the secondary outlets 88 to pass through the slots 96 and space 116 of the bearing 26a to wash said bearing surfaces and prevent excessive heat from being transmitted from the bearing 26a to the housing 30 which comes into direct contact with said bearing. This acts to prevent excessive heat build-up which would otherwise be harmful to either the bearing 26a or the plastic housing 30.

The improved bearings 26 and 26a are mounted so as to be in the path of cooling secondary air drawn through the second chamber 68 and insures the operating temperature radiant of the bearings 26 and 26a will never become excessive. The bearings 26 or 26a may be made of a non-magnetic metal, such as a suitable bronze or brass, and may be formed by sintering, with or without the additional feature of oil impregnation.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention what is claimed herein is:

1. A bearing assembly for a power tool comprising:
    a. a housing formed of plastic,
    b. a universal motor having a stator and an armature mounted in the housing,
    c. a shaft for the armature disposed axially in the housing and having a fan affixed thereto,
    d. apertures formed in the housing in axially spaced relationship on either side of the fan to permit ventilating air to enter and to exit the housing to cool the motor,
    e. a first bearing means connected in the housing to journal one end of the armature shaft,
    f. a second bearing means to journal the other end of the armature shaft,
    g. a motor chamber formed in the housing in communication with said apertures,
    h. a second chamber formed in the housing adjacent the second bearing means, and
    i. a plurality of apertures formed in the second bearing means to permit circulatoin of the ventilating air through the second bearing means from the second chamber, drawn by the fan in the motor chamber, to cool the second bearing means and the housing.

2. The combination claimed in claim 1 wherein:
    a. a gear chamber formed in the housing adjacent to the second chamber and remote from the motor chamber, and
    b. means formed on the second bearing means to define a grease seal between the motor chamber and the gear chamber.

3. The combination claimed in claim 2 wherein:
    a. a recess formed in the housing,
    b. the second bearing means seated within said recess,
    c. the apertures of the second bearing means defining axial slots,
    d. an annular flange formed on the second bearing means to extend radially above the axial slots and to define a grease seal to prevent the passage of grease from the gear chamber, and
    e. a plurality of radial projections on the second bearing means formed alternately with the ventilating apertures thereon.

4. The combination claimed in claim 1 wherein:
    a. the second chamber having an external aperture to draw secondary air from outside the housing into and through the second chamber to cool the second bearing and the housing.

5. The combination claimed in claim 1 wherein:
    a. the second chamber having an aperture radially above the second bearing and in communication with the motor chamber to draw ventilating air from the motor chamber for passage through the second bearing prior to discharge from the housing discharge aperture.

* * * * *